(12) United States Patent
Cuomo et al.

(10) Patent No.: US 10,477,359 B2
(45) Date of Patent: *Nov. 12, 2019

(54) PUBLISHING MESSAGES BASED ON GEOGRAPHIC AREA

(71) Applicant: International Business Machines Corporation, Armonk, NY (US)

(72) Inventors: Gennaro A. Cuomo, Durham, NC (US); Gari R. Singh, Wilmington, MA (US); Meeta Yadav, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 57 days.

This patent is subject to a terminal disclaimer.

(21) Appl. No.: 14/563,107

(22) Filed: Dec. 8, 2014

(65) Prior Publication Data
US 2016/0165415 A1    Jun. 9, 2016

(51) Int. Cl.
*H04W 24/00* (2009.01)
*H04H 20/71* (2008.01)
*H04W 4/06* (2009.01)
*H04W 4/021* (2018.01)
*H04W 4/12* (2009.01)

(52) U.S. Cl.
CPC ............. *H04W 4/06* (2013.01); *H04W 4/021* (2013.01); *H04W 4/12* (2013.01)

(58) Field of Classification Search
CPC ................................ H04W 4/12; H04W 4/021
See application file for complete search history.

(56) References Cited

U.S. PATENT DOCUMENTS

| 8,050,689 | B2  | 11/2011 | Riise et al. | |
| 2006/0068762 | A1* | 3/2006 | Baldwin | H04W 4/12 455/412.1 |
| 2006/0068767 | A1  | 3/2006 | Bhakta et al. | |
| 2012/0327837 | A1* | 12/2012 | Harrington | H04W 4/22 370/312 |

(Continued)

FOREIGN PATENT DOCUMENTS

WO    WO2014036685 A1    3/2014

OTHER PUBLICATIONS

List of IBM Patents or Patent Applications Treated as Related—dated Aug. 4, 2015; 2 pages.

(Continued)

*Primary Examiner* — Rafael Pérez-Gutiérrez
*Assistant Examiner* — Mark G. Pannell
(74) *Attorney, Agent, or Firm* — Cantor Colburn LLP; Nicholas Bowman (57) ABSTRACT

Embodiments relate to methods, systems and computer program products for publishing messages within a geographic area. Aspects include receiving a location from each of a plurality of user devices and creating a geo-hash tree based on the location of each of a plurality of user devices. Aspects also include receiving a message with the geographic area, computing a geo-hash grid for a region that includes the geographic area and identifying one or more nodes of the geo-hash tree that corresponds to the geo-hash grid. Aspects further include transmitting the message to one or more of the plurality of user devices associated with the one or more identified nodes.

16 Claims, 6 Drawing Sheets

(56) References Cited

U.S. PATENT DOCUMENTS

| | | |
|---|---|---|
| 2013/0130683 A1 | 5/2013 | Krukar |
| 2013/0212065 A1* | 8/2013 | Rahnama .......... G06F 17/30002 |
| | | 707/609 |
| 2013/0268626 A1 | 10/2013 | Deeming et al. |
| 2014/0222573 A1 | 8/2014 | Middleton et al. |
| 2014/0222685 A1 | 8/2014 | Middleton et al. |
| 2014/0274154 A1* | 9/2014 | Rana .................. G06Q 30/0282 |
| | | 455/456.3 |
| 2015/0215409 A1* | 7/2015 | Chow ................ G06Q 30/0259 |
| | | 455/456.3 |

OTHER PUBLICATIONS

U.S. Appl. No. 14/817,415, filed Aug. 4, 2015; Entitled: Publishing Messages Based on Geographic Area.

List of IBM Patents or Patent Applications Treated as Related—dated Feb. 23, 2015; 2 pages.

U.S. Appl. No. 14/332,551, filed Jul. 16, 2014; Entitled: Routing Messages Based on Geolocation Information.

U.S. Appl. No. 14/628,343, filed Feb. 23, 2015; Entitled: Routing Messages Based on Geolocation Information.

* cited by examiner

PUBLISHING MESSAGES BASED ON GEOGRAPHIC AREA

BACKGROUND

The present invention relates generally to publishing messages within a geographic area and more particularly to publishing messages to devices within a geographic area using a publish/subscribe messaging system.

In general, a publish/subscribe messaging system delivers messages from producers to consumers by routing messages based on topics and predicate evaluation. Recently, there has been a desire to route messages based on location information such as the location of the subscriber and/or the publisher. As the number of internet connected devices continues to grow, the need to route a large volume of messages at a predictably low latency on geolocation information and to route messages on correlated sensor attribute and location information, will drastically increase the amount of messages to be routed based on location information.

Currently available messaging systems cannot keep up with the volume and latency requirements of real time messaging while accurately routing messages based on location information. Instead, in order to keep up with the with the volume and latency requirements of real time messaging currently available messaging systems sacrifice the accuracy of the location information used for routing messages. For example, many of these systems use a technique known as geo-hashing, which divides geographical areas into fixed size rectangles that are associated with a geo-hash code. Due to the fact that actual geographic areas of interest are seldom rectangles that perfectly align with a rectangle associated with a specific geo-hash code, geo-hashing suffers from both false positives and false negatives which can cause negative consequences.

SUMMARY

Embodiments include methods for publishing messages within a geographic area. The method includes receiving a location from each of a plurality of user devices and creating a geo-hash tree based on the location of each of a plurality of user devices. The method also includes receiving a message with the geographic area, computing a geo-hash grid for a region that includes the geographic area and identifying one or more nodes of the geo-hash tree that correspond to the geo-hash grid. The method further includes transmitting the message to one or more of the plurality of user devices associated with the one or more identified nodes.

In exemplary embodiments, computing a geo-hash grid for a region that includes the geographic area includes receiving a definition of the geographic area, computing geo-hashes for a plurality of points along the perimeter of the geographic area and comparing a common part of the geo-hashes for the plurality of points along the perimeter of the geographic area to find a geo-hash grid that contains the geographic area.

Embodiments also include a computer program product for publishing messages within a geographic area, the computer program product including a tangible storage medium readable by a processing circuit and storing instructions for execution by the processing circuit for performing a method. The method includes receiving a location from each of a plurality of user devices and creating a geo-hash tree based on the location of each of a plurality of user devices. The method also includes receiving a message with the geographic area, computing a geo-hash grid for a region that includes the geographic area and identifying one or more nodes of the geo-hash tree that correspond to the geo-hash grid. The method further includes transmitting the message to one or more of the plurality of user devices associated with the one or more identified nodes.

Embodiments further include a messaging system for publishing messages within a geographic area, the messaging system comprising a processor configured for performing a method. The method includes receiving a location from each of a plurality of user devices and creating a geo-hash tree based on the location of each of a plurality of user devices. The method also includes receiving a message with the geographic area, computing a geo-hash grid for a region that includes the geographic area and identifying one or more nodes of the geo-hash tree that correspond to the geo-hash grid. The method further includes transmitting the message to one or more of the plurality of user devices associated with the one or more identified nodes.

One advantage of the messaging system for publishing messages within a geographic area is that it provides for accurate low latency delivery of messages to users with in a geographic area.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
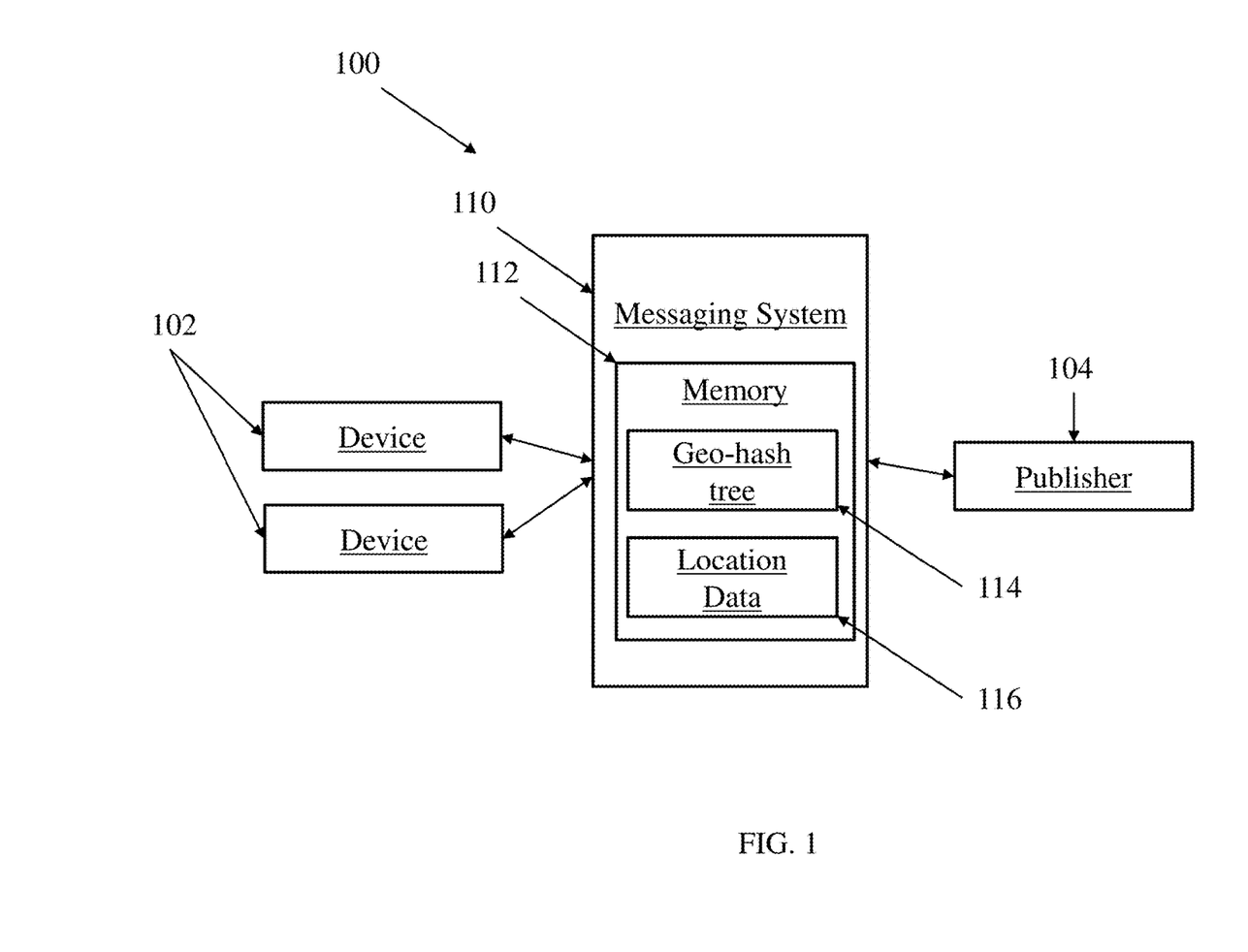
FIG. 1 depicts a block diagram of a system for publishing messages within a geographic area in accordance with an exemplary embodiment.

Referring to the drawings in more detail, and particularly referring to FIG. 1, a system 100 for publishing messages within a geographic area in accordance with an exemplary embodiment is shown. As illustrated the system 100 includes one or more devices 102 and one or more publishers 104 that are in communication with a messaging system 110. In exemplary embodiments, the publisher 104 utilizes the messaging system 110 to transmit a message to devices 102 in a geographic area that the publisher 104 associates with the message. For example, a publisher, such as a local merchant, may transmit a message that has an associated geographic area of a small area around their store to publish messages regarding sales, events and the like to devices 102 within the geographic area.

In exemplary embodiments, each of the devices 102 utilizes the messaging system 110 to receive messages from one or more publishers 104 based on the location of the device 102 and the geographic area associated with the message. In exemplary embodiments, the messaging system 110 includes a memory 112 that may include, but is not limited to, a geo-hash tree 114, which stores the location of the devices 102, and location data 116. The location data 116 may include, but is not limited to, the geographic area that was defined by the publishers 104. In exemplary embodiments, the devices 102, the publishers 104 and the messaging system 110 may be embodied in a computer system as shown and described with reference to FIG. 2. In exemplary embodiments the devices 102 and the publishers 104 may be embodied in smartphones, tablets or other computing devices.

In exemplary embodiments, the geo-hash tree 114 stored in the memory 112 may also store additional information regarding the devices 102. In one embodiment, the geo-hash tree 114 may store a timestamp of the latest location data received from the device 102. This information may be used by the messaging system and the publisher in determining what type of messages to send to the device. For example, a store owner may wish to send one type of message to customers with devices 102 that have recently arrived in their store and other messages to customers with devices 102 which have been in their store for an extended period of time.

In addition, the geo-hash tree 114 may store one or more user preferences received from the device 102 regarding the type of messages that the user of the device 102 would like to receive or to not receive. Likewise, the geo-hash tree 114 may store a device type identifier, which can identify the make, model, and operating system of the device, that can be used by the messaging system to control the format of the messages sent to the device 102.

Figure 2:
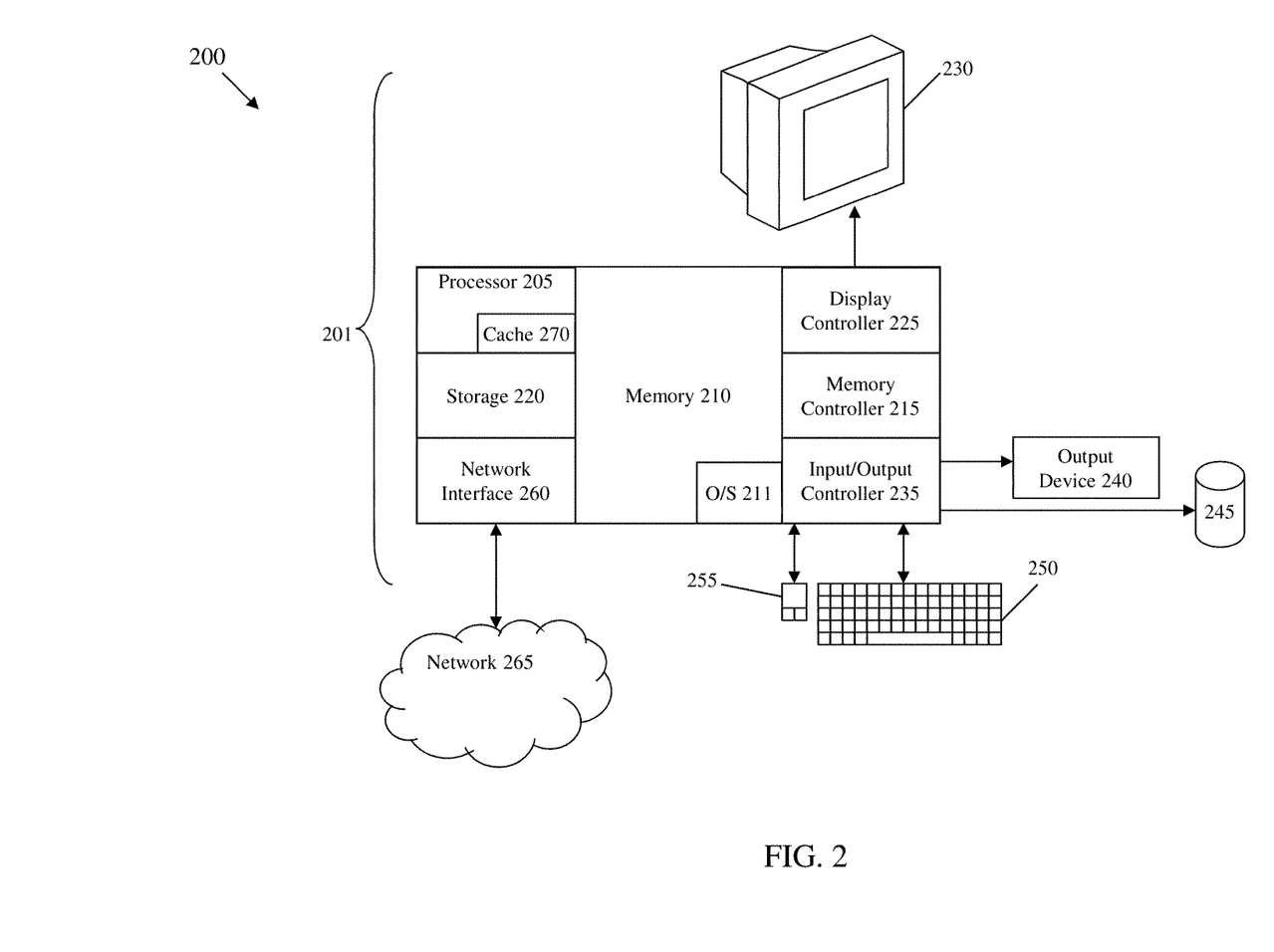
FIG. 2 depicts a block diagram of a computing system in accordance with an exemplary embodiment.

FIG. 2 illustrates a block diagram of an exemplary computer system 200 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 200 therefore includes general-purpose computer 201.

In an exemplary embodiment, in terms of hardware architecture, as shown in FIG. 2, the computer 201 includes a processor 205, memory 210 coupled via a memory controller 215, a storage device 220, and one or more input and/or output (I/O) devices 240, 245 (or peripherals) that are communicatively coupled via a local input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 220 may include one or more hard disk drives (HDD), solid state drives (SSD), or any other suitable form of storage.

The processor 205 is a computing device for executing hardware instructions or software, particularly that stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions. The processor 205 may include a cache 270, which may be organized as a hierarchy of more cache levels (L1, L2, etc.).

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially controls the execution of other computer programs and provides scheduling, input-output control, file and data management, memory management, and communication control and related services.

In an exemplary embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 165. The network 265 can be an IP-based network for communication between the computer 201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as Wi-Fi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential routines that initialize and test hardware at startup, start the OS 211, and support the transfer of data among the storage devices. The BIOS is stored in ROM so that the BIOS can be executed when the computer 201 is activated.

When the computer 201 is in operation, the processor 205 is configured to execute instructions stored within the memory 210, to communicate data to and from the memory 210, and to generally control operations of the computer 201 pursuant to the instructions.

Figure 3:
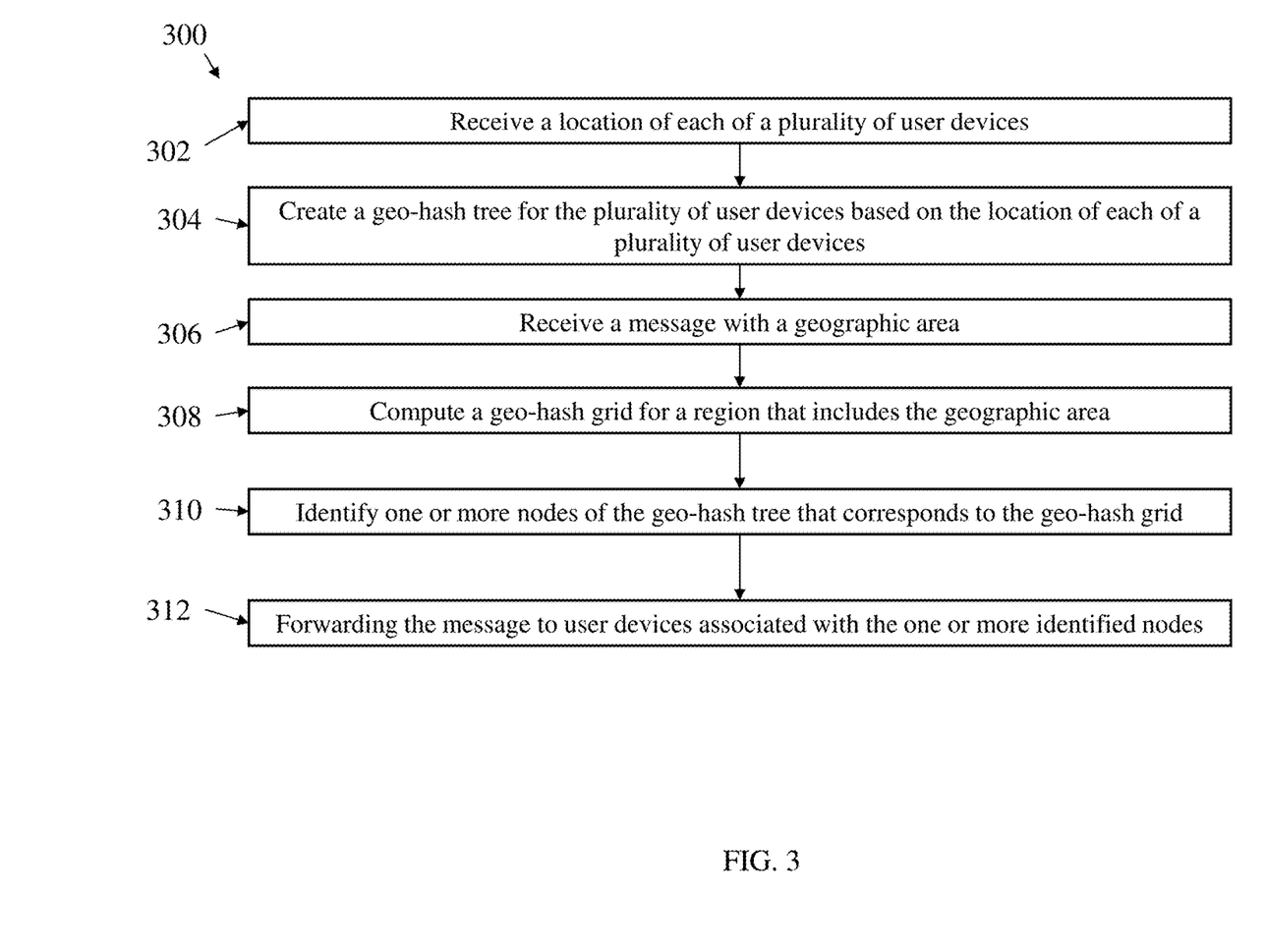
FIG. 3 depicts a block diagram illustration of a method for publishing messages within a geographic area in accordance with an exemplary embodiment.

Referring now to FIG. 3, a flow chart diagram of a method 300 for publishing messages within a geographic area in accordance with an exemplary embodiment is shown. As shown at block 302, the method 300 includes receiving a location of each of a plurality of user devices. Next, as shown at block 304, the method 300 includes creating a geo-hash tree for the plurality of user devices based on the location of each of a plurality of user devices. In exemplary embodiments, the geo-hash tree is an ordered tree data structure that is used to store a geo-hash location for each of the plurality of devices. In exemplary embodiments, each of the nodes of the geo-hash tree may be associated with one or more devices that are located in the geographic area represented by the geo-hash address represented by the node location. Next, as shown at block 306, the method 300 includes receiving a message with an associated geographic area. In exemplary embodiments, the geographic area that is specified by a publisher. In exemplary embodiments, the user may create the definition of the area of interest by drawing the area of interest on a map. For example, a user may use a GUI interface to draw a polygon representing an area of interest. In another example, a user may use a GUI interface to select a point of interest and a desired radius to create the definition area of interest.

Continuing with reference to FIG. 3, as shown at block 308, the method 300 includes computing a geo-hash grid for a region that includes the entire geographic area. In exemplary embodiments, computing a geo-hash grid for a region that includes the geographic area includes computing geo-hashes for a plurality of points along the perimeter of the geographic area. In exemplary embodiments, computing a geo-hash grid for a region that includes the geographic area also includes comparing the common part of the geo-hashes for the plurality of points along the perimeter of the geographic area to find the geo-hash grid that contains the entire geographic area. For example, if the geographic area is a polygon, a geo-hash is computed for each corner of the polygon. In another example, if the geographic area is a circle, a geo-hash is computed for a plurality of points along the circumference of the circle. As used herein a geo-hash is a well-known hierarchical spatial data structure which subdivides space into buckets of grid shape. In exemplary embodiments, a geo-hash is computed based on converting numerical latitude and longitude coordinates to a base 32 numbering system. In general, geo-hashes offer arbitrary precision by removing characters from the end of the code to reduce its size. Next, as shown at block 310, the method 300 includes identifying one or more nodes of the geo-hash trees that corresponds to the geo-hash grid. The method 300 also includes forwarding the message to user devices associated with the identified node, as shown at block 312.

Figure 4:
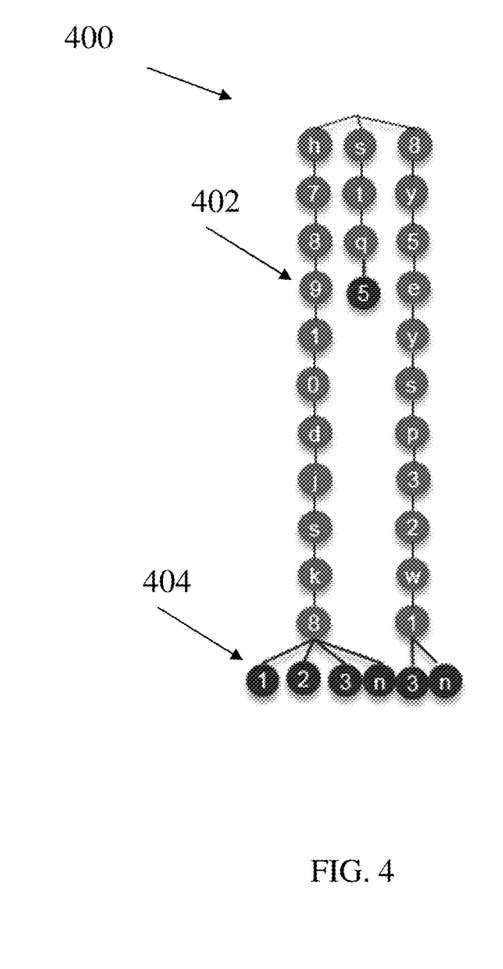
FIG. 4 depicts an illustration of a geo-hash tree for tracking the location of user devices in accordance with an exemplary embodiment.

FIG. 4 illustrates a geo-hash tree 400 in accordance with an exemplary embodiment. As shown the geo-hash tree 400 includes a plurality of geo-hash nodes 402 and a plurality of device nodes 404. In exemplary embodiments, each of the device nodes 404 is a leaf node that depends from one of the geo-hash nodes 402. As illustrated, more than one device node 404 may depend from, or be associated with, a single geo-hash node 402. In exemplary embodiments, each of the device nodes 404 corresponds to a user device that is located in the geographic area defined by the address of the device node 404. For example, as illustrated device number 5 is located in the geographic area that has geo-hash code "stq" and device number 1 is located in the geographic area that has geo-hash code "h78910djsk8." In exemplary embodiments, the user device may provide a location that includes an accuracy that is controlled by the user, for example in a privacy setting menu. The accuracy of the location of the user device provided dictates the length of the geo-hash code.

Figure 5:
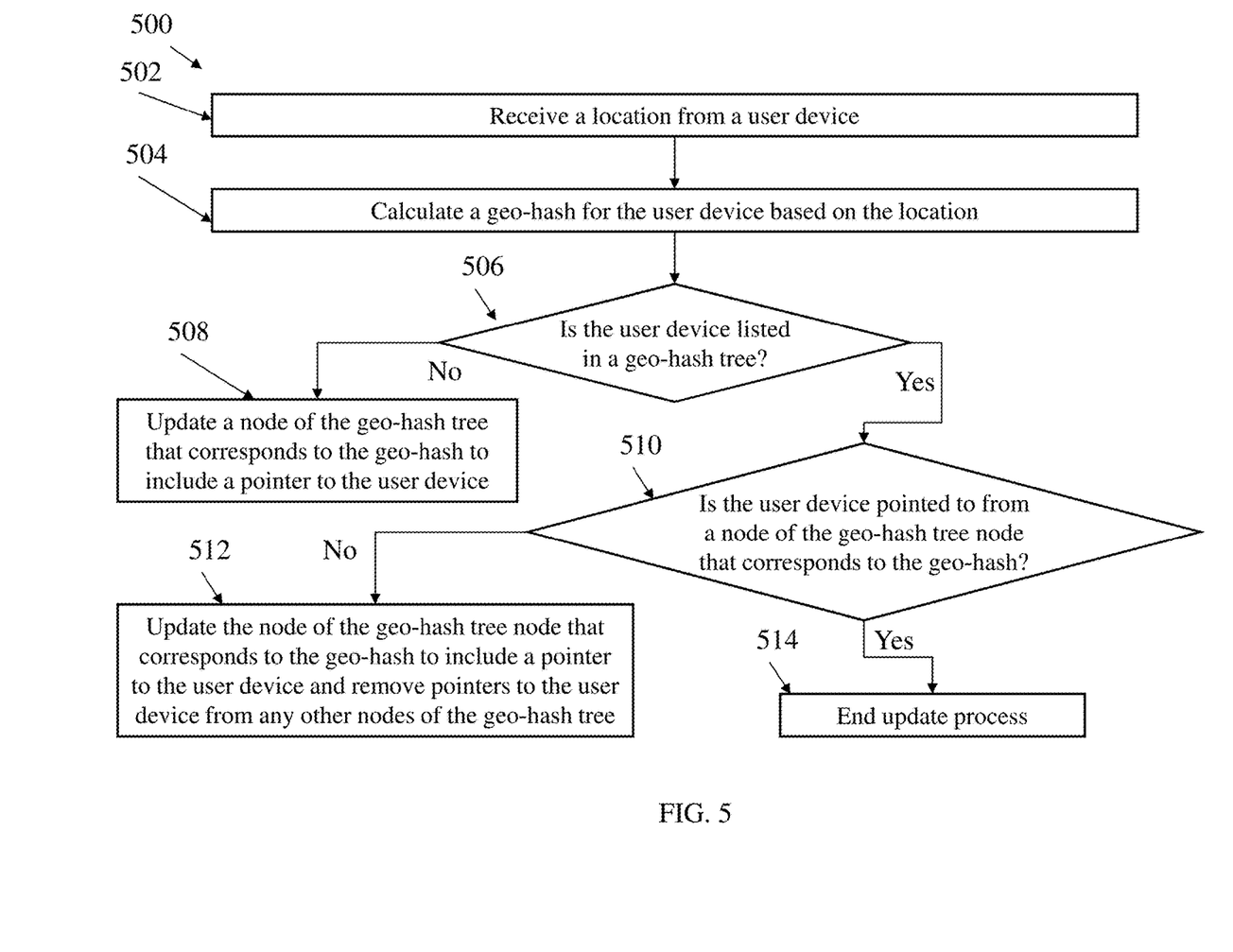
FIG. 5 depicts a block diagram illustration of a method for updating a geo-hash tree for a user device in accordance with an exemplary embodiment.

Referring now to FIG. 5, a flow chart diagram of a method 500 updating a geo-hash tree for a user device in accordance with an exemplary embodiment is shown. As shown at block 502, the method 500 includes receiving a location from a user device. In exemplary embodiments, user devices are configured to transmit location updates to the messaging system. The user device may transmit location data to the messaging system periodically or after the user device determines that its location has changed by more than a minimum threshold amount. Next, as shown at block 504, the method 500 includes calculating a geo-hash for the user device based on the location. As shown at decision block 506, the method 500 includes determining if the user device is listed in a geo-hash tree. In other words, was the location of the user device already known and stored in the geo-hash tree.

If the user device was not listed in a geo-hash tree, the method 500 proceeds to block 508 and includes updating a node of the geo-hash tree that that corresponds to the geo-hash to include a pointer to the user device. If the user device is listed in the geo-hash tree, the method 500 proceeds to decision block 510 and includes determining if the user device is pointed to from a node of the geo-hash tree node that corresponds to the geo-hash. If the user device not pointed to from a node of the geo-hash tree node that corresponds to the geo-hash, the method 500 proceeds to block 512 and includes updating the node of the geo-hash tree node that corresponds to the geo-hash to include a pointer to the user device and removing pointers to the user device from any other nodes of the geo-hash tree. If the user device is not pointed to from a node of the geo-hash tree node that corresponds to the geo-hash, the method 500 proceeds to block 514 and concludes.

Figure 6:
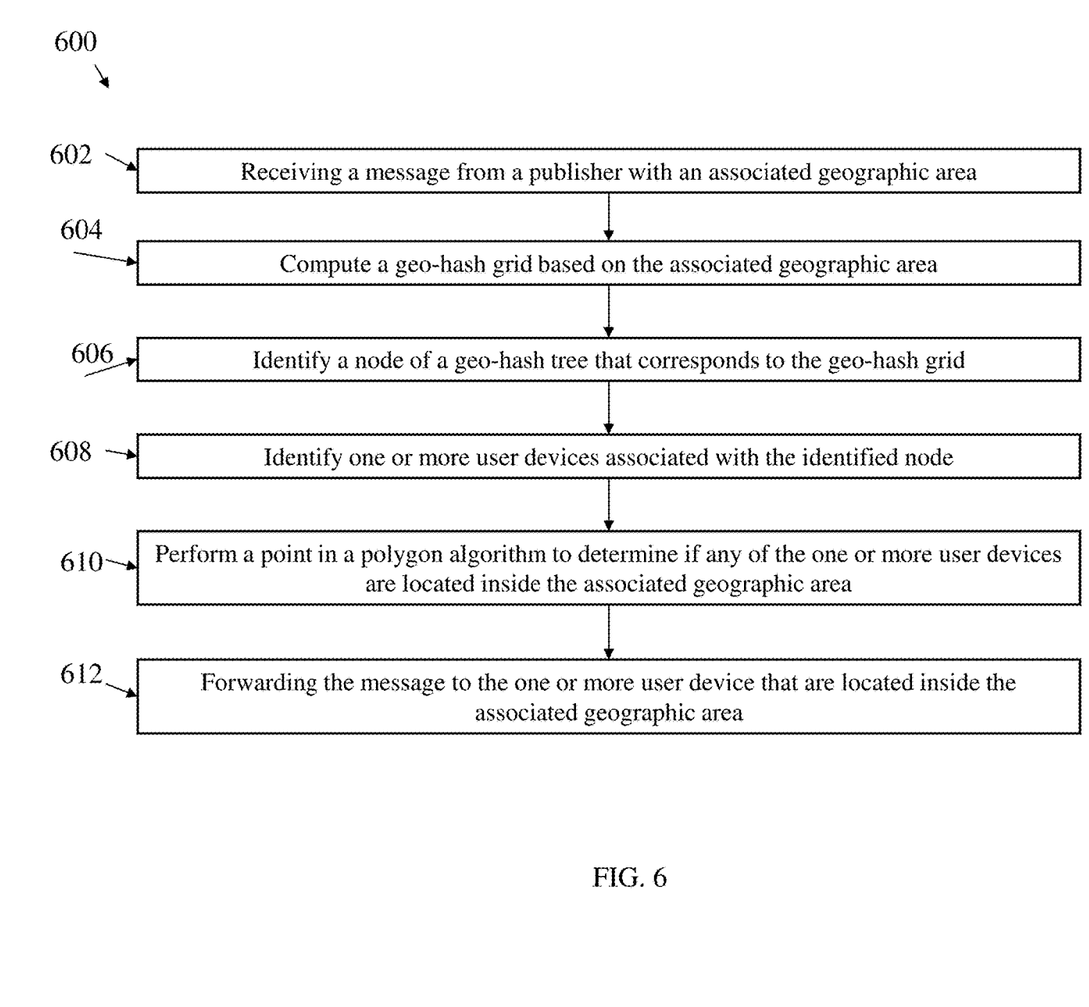
FIG. 6 depicts a block diagram illustration of a method for publishing messages within a geographic area in accordance with an exemplary embodiment.

Referring now to FIG. 6, a flow chart diagram of a method 600 for publishing messages within a geographic area in accordance with an exemplary embodiment is shown. As shown at block 602, the method 600 includes receiving an incoming message from a publisher with an associated geographic area. Next, as shown at block 604, the method 600 includes computing a geo-hash grid based on the geographic area associated with the message. In exemplary embodiments, computing a geo-hash grid for a region that includes the geographic area also includes comparing the common part of the geo-hashes for the plurality of points along the perimeter of the geographic area to find the geo-hash grid that contains the entire geographic area. For example, if the geographic area is a polygon, a geo-hash is computed for each corner of the polygon. In another example, if the geographic area is a circle, a geo-hash is computed for a plurality of points along the circumference of the circle.

Next, after the geo-hash associated with the message is computed, the method 600 includes identifying one or more nodes of a geo-hash tree that corresponds to the geo-hash grid, as shown at block 606. In exemplary embodiments, identifying a node of a geo-hash tree that corresponds to the geo-hash grid includes traversing the geo-hash tree based on the geo-hash grid. Next, as shown at block 608, the method 600 includes identifying one or more user devices associated with the identified nodes. In exemplary embodiments, the one or more devices may be pointed to by the identified nodes or they may be stored in a list stored by the identified node.

Continuing with reference to FIG. 6, the method 600 includes performing a point in a polygon algorithm to determine if any of the one or more user devices are located inside the associated geographic area, as shown at block 610. In exemplary embodiments, a point in polygon algorithm determines problem whether a given point is located inside, outside, or on the boundary of a polygon. Various point in polygon algorithms are well known and any of the well-known point in polygon algorithms, such as ray casting or angle summation. The method 600 also includes forwarding the message to the one or more user device that are located inside the associated geographic area, as shown at block 612.

In exemplary embodiments, the method for routing messages based on geolocation is capable of routing a large volume of geolocation messages at predictably low latency with extremely high accuracy. In one embodiment, the method for routing messages based on geolocation achieves 100% accuracy and has a 0% false positive and 0% false negative rate.

Technical effects and benefits of the messaging system provided here include utilizing geo-hashing to selectively transmit messages to mobile devices that are within a desired geographic area in an accurate manner that is scalable and able to operate with low latency. In addition, the messaging system is configured to allow the accuracy of the definition of the geographic area to be tuned to meet desired performance characteristics.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for publishing messages within a geographic area, the computer program product comprising:
    a non-transitory storage medium readable by a processing circuit and storing instructions for execution by the processing circuit for performing a method comprising:
    receiving a location from each of a plurality of user devices;
    creating a geo-hash tree based on the location of each of a plurality of user devices;
    receiving a message with the geographic area, wherein the geographic area is non-rectangular;
    computing a geo-hash grid for a region that includes the geographic area, wherein the region includes an entirety of the geographic area and one or more areas that are not within the geographic area;
    identifying one or more nodes of the geo-hash tree that correspond to the geo-hash grid as candidate nodes;
    performing a point in a polygon algorithm for each of the candidate nodes to determine whether each of the one or more of the plurality of user devices associated with the candidate nodes are located inside or outside a boundary of the geographic area; and
    transmitting the message to one or more of the plurality of user devices associated with the candidate nodes that are determined to be located inside the geographic area.

2. The computer program product of claim 1, wherein computing the geo-hash grid for the region that includes the geographic area comprises:
    receiving a definition of the geographic area;
    computing geo-hashes for a plurality of points along the perimeter of the geographic area; and
    comparing a common part of the geo-hashes for the plurality of points along the perimeter of the geographic area to find the geo-hash grid that contains the region that includes the geographic area.

3. The computer program product of claim 1, wherein the method further comprises receiving location updates from at least one of the plurality of user devices and responsively updating the geo-hash tree.

4. The computer program product of claim 1, wherein the geo-hash tree includes a plurality of geo-hash nodes and one or more device nodes.

5. The computer program product of claim 4, wherein an address of the one or more device nodes in the geo-hast tree corresponds to the location of each of the one or more device nodes.

6. The computer program product of claim 1, wherein an accuracy of the location received from each of the plurality of user devices is determined by a user of the plurality of user devices.

7. The computer program product of claim 1, wherein the geo-hash tree further comprises a device identifier for each of the plurality of user devices, wherein the device identifier is indicative of a make, a model and an operating system of a user device.

8. The computer program product of claim 1, wherein the geo-hash tree further comprises a time stamp for a latest location of each of the plurality of user devices.

9. A messaging system for publishing messages within a geographic area, the messaging system comprising a processor configured for performing a method comprising:
    receiving a location from each of a plurality of user devices;
    creating a geo-hash tree based on the location of each of a plurality of user devices;
    receiving a message with the geographic area, wherein the geographic area is non-rectangular;
    computing a geo-hash grid for a region that includes the geographic area, wherein the region includes an entirety of the geographic area and one or more areas that are not within the geographic area;
    identifying one or more nodes of the geo-hash tree that correspond to the geo-hash grid as candidate nodes;
    performing a point in a polygon algorithm to determine whether each of the one or more of the plurality of user devices associated with the candidate nodes are located inside or outside a boundary of the geographic area; and
    transmitting the message to one or more of the plurality of user devices associated with the candidate nodes that are determined to be located inside the geographic area.

10. The messaging system of claim 9, wherein computing the geo-hash grid for the region that includes the geographic area comprises:

receiving a definition of the geographic area;

computing geo-hashes for a plurality of points along the perimeter of the geographic area; and comparing a common part of the geo-hashes for the plurality of points along the perimeter of the geographic area to find the geo-hash grid that contains the region that includes the geographic area.

11. The messaging system of claim 9, further comprising receiving location updates from at least one of the plurality of user devices and responsively updating the geo-hash tree.

12. The messaging system of claim 9, wherein the geo-hash tree includes a plurality of geo-hash nodes and one or more device nodes.

13. The messaging system of claim 12, wherein an address of the one or more device nodes in the geo-hast tree corresponds to the location of each of the one or more device nodes.

14. The messaging system of claim 9, wherein the geo-hash tree further comprises a device identifier for each of the plurality of user devices, wherein the device identifier is indicative of a make, a model and an operating system of a user device.

15. The messaging system of claim 9, wherein the geo-hash tree further comprises a time stamp for a latest location of each of the plurality of user devices.

16. A computer program product for publishing messages within a geographic area, the computer program product comprising:

a non-transitory storage medium readable by a processing circuit and storing instructions for execution by the processing circuit for performing a method comprising:

receiving a location from each of a plurality of user devices;

creating a geo-hash tree based on the location of each of a plurality of user devices;

receiving a message with the geographic area;

computing a geo-hash grid for a region that includes the geographic area;

identifying one or more nodes of the geo-hash tree that correspond to the geo-hash grid;

performing a point in a polygon algorithm to determine if the one or more of the plurality of user devices associated with the one or more identified nodes are located inside the geographic area; and transmitting the message to one or more of the plurality of user devices associated with the one or more identified nodes that are determined to be located inside the geographic area.

* * * * *